R. H. GRANT.
BATTERY INDICATING DEVICE.
APPLICATION FILED MAR. 31, 1916.
1,366,533.
Patented Jan. 25, 1921.
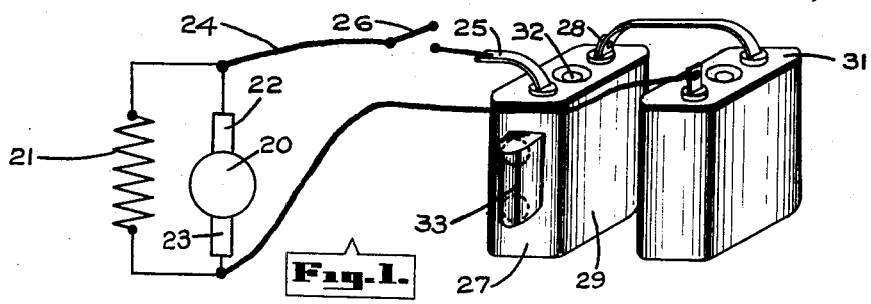
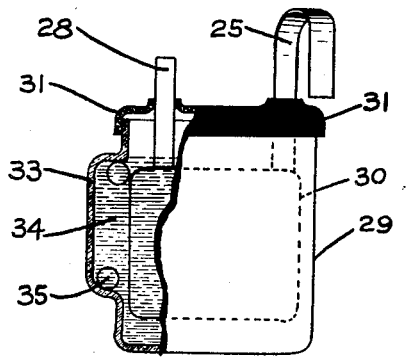
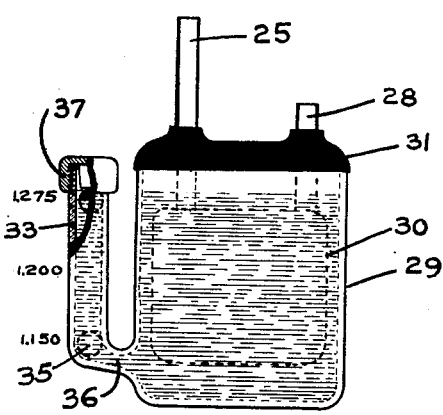
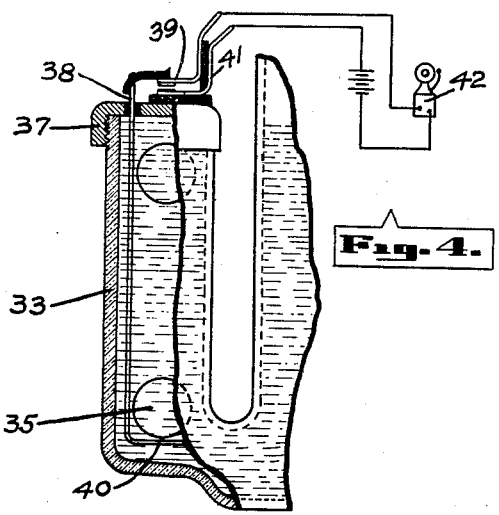
Witnesses
Inventor
Ralph H. Grant
By Kerr Page, Cooper & Hayward
Attorneys.

UNITED STATES PATENT OFFICE.

RALPH H. GRANT, OF DAYTON, OHIO, ASSIGNOR, BY MESNE ASSIGNMENTS, TO DELCO-LIGHT COMPANY, OF DAYTON, OHIO, A CORPORATION OF DELAWARE.

BATTERY INDICATING DEVICE.

1,366,533.                Specification of Letters Patent.    Patented Jan. 25, 1921.

Application filed March 31, 1916. Serial No. 88,105.

*To all whom it may concern:*

Be it known that I, RALPH H. GRANT, a citizen of the United States of America, residing at Dayton, county of Montgomery, and State of Ohio, have invented certain new and useful Improvements in Battery Indicating Devices, of which the following is a full, clear, and exact description.

The present invention relates to devices or mechanisms for indicating the condition of electrical storage batteries.

One of the objects of the present invention is to provide a storge battery, including a battery casing adapted to contain the usual battery elements, and having a communicating chamber in combination with indicating devices contained within this supplemental chamber, and adapted to be affected by the gravity condition of the electrolyte in the main chamber of the battery, in such a manner as to indicate by their positions the condition of the battery.

Another object of the present invention is to provide indicating devices for batteries, which are actuated by the gravity of the electrolyte of the batteries, in combination with signaling devices so that when the indicating devices are in determined positions, the signaling devices will be brought into operation.

A further object of the present invention is to form the walls of this supplemental chamber either in whole or in part of transparent material, so as to readily enable the attendant or operator to note the condition of the battery, as indicated.

Further objects and advantages of the present invention will be apparent from the following description, reference being had to the accompanying drawings, wherein preferred embodiments of the present invention are clearly illustrated.

Referring to the drawing:

Figure 1 is a diagrammatic view of the circuit and devices included in the present invention.

Fig. 2 is an enlarged view in elevation of a battery jar or cell, embodying one form of the present invention.

Fig. 3 is a sectional view of a battery jar, embodying a modified form of the invention.

Fig. 4 is a view of a further modified form of the present invention.

Referring to Fig. 1, there is disclosed an electrical system, which includes a generator 20, having a shunt field winding 21, connected directly across the commutator brushes 22 and 23.

While the drawing illustrates a generator of the shunt wound type, it will be obvious that any type of generator may be used in a system embodying the present invention, and that this specific type of generator has simply been used for the purposes of illustration.

The brush 22 is connected to one side 24 of the main line, and includes a switch 26, which may be of any suitable type. This side of the main line is connected to a positive terminal 25, of one of the battery cells, 27.

The drawing illustrates a battery including two cells, but it will be obvious that this battery may include any number of cells to meet different requirements.

The negative terminal 28 of the cell, is made of any suitable material, such as strap lead or other conductive metal, and is much shorter than the positive terminal 25. This facilitates the connecting up of the correct terminals of the adjacent cells of the battery, inasmuch as the elongated terminal of the positive side of the battery will lie adjacent to the short negative terminal of the next adjacent cell. This construction and arrangement of the respective terminals tends to prevent the incorrect connecting up of the battery cells, and insures the correct battery connections.

In Fig. 1 of the attached drawing, the battery cell 27 comprises a main chamber 29, which is adapted to contain the electrolyte of the battery, and the positive and negative plates, together with the separators and other elements which are usually included in an assembly of this sort.

The above mentioned elements, namely the plates and separators, will be referred to hereinafter as the plate assembly 30. This assembly is supported within the main chamber 29 of the cell 27, by being suspended from the cover 31, which in turn is provided with the usual opening 32, to permit water and electrolyte to be added to the battery, and also to permit the escape of gases, etc.

In addition to the main chamber 29, the cell 27 includes a supplemental chamber 33, which is formed by enlarging a portion of one of the walls of the battery jar or cell, (see Figs. 1 and 2).

The modified forms of the invention shown in Figs. 3 and 4, will be described in detail hereinafter.

In the form of the present invention shown in Figs. 1 and 2, the main battery jar is formed of glass or other suitable material, and in this particular instance, the enlargement may be formed integral with the main jar, in any suitable manner. By forming this enlargement on the main jar, the supplemental chamber 33 is so formed that it communicates with the interior of the jar or the main chamber 29. This communication is such that the level of the electrolyte 34 in the supplemental chamber 33 will at all times equal the level of the electrolyte in the main chamber 29.

As is well known in the storage battery art, the specific gravity of the electrolyte or liquid contents of the battery increases and decreases in accordance with the state of charge of said battery. That is, the state of charge of an electric storage battery is one of the main governing features of the specific gravity of said battery. For instance, a fully charged battery will have a specific gravity of substantially 1.275, while the specific gravity of a battery totally discharged, will be under 1.100.

In order to indicate the condition of the battery, a plurality of indicating members 35 are positioned in the supplemental chamber 33, see Fig. 2. These indicating members are constructed in any suitable manner, but have different degrees of buoyancy. That is, the respective members will vary as to weight, and therefore their relative positions in the electrolyte, contained in the supplemental chamber 33, will change as the specific gravity of this electrolyte changes.

In the present instance, there are shown two of these indicating members, but this is only for the purposes of illustration, inasmuch as there may be a greater or a less number, as may be desirable.

As will be seen by referring to Fig. 2, the supplemental chamber 33 is in communication substantially throughout its extent with the main chamber 29. Now, in order to maintain the indicating members 35 within the supplemental chamber, and to prevent their inadvertent displacement, the plate assembly 30 is so assembled in the main chamber 29 that the end faces of the respective elements of the plate assembly will rest in such a position that the balls will be prevented from displacement from the chamber 33. It will therefore be seen that as long as the plate assembly is in assembled position, the indicating elements will be maintained in the chamber 33.

In Figs. 3 and 4, modified forms of the present invention are illustrated.

In Fig. 3, the jar or cell 27 is so formed that the supplemental chamber containing the indicating members 35 projects from the main portion of the jar and communicates with the main chamber 29, as at 36. In this particular form of the invention, the plate assembly has no function of maintaining the indicating members within the supplemental chamber, as in Fig. 2.

In the form shown in Fig. 3, the diameter of the communicating passage-way between the auxiliary portion of the cell 27 and the main chamber 29, is less than the diameter of the indicating members 35.

In order to facilitate the assembling of the indicating members in the form of the invention shown in Figs. 3 and 4, the auxiliary portion, including the chamber 33, is provided with a screw threaded cap 37, which acts as a cover or top for the supplemental chamber.

In view of the fact that the main chamber 29 communicates with the chamber formed within the projecting member 33, the level of the electrolyte in the supplemental chamber 33 will be the same as the electrolyte in the main chamber 29.

The indicating members 35 in the present form of the invention are substantially the same as those illustrated and described in connection with Fig. 2, and their position in the supplemental chamber is determined by the specific gravity of the electrolyte.

In Fig. 4, a further modified form is illustrated, wherein a supplemental signaling device is combined with the indicating members. This supplemental signaling device is illustrated as including an electric bell 42, but other forms of signaling devices may be employed.

In the specific structure shown in Fig. 4, an elongated rod or plate 38 is illustrated as being contained within the supplemental chamber 33, having the lower end of said rod bent so as to form a receiving seat or support for the indicating members, when they are in a predetermined position. The opposite end of the rod 38 projects through the threaded cap 37, and engages with the contact plate 39, at such times as the rod is depressed, due to the weight of the indicating members 35.

Now, as soon as the specific gravity of the electrolyte within the supplemental chamber 33 reaches a determined point, both balls will sink to such a degree as to rest upon the seat portion 40 of the rod 38. This in turn will tend to draw down the rod 38 and thereby close the contacts 39 and 41, and thus effect a ringing of the bell 42.

This modified form of the present invention is especially adaptable where the battery is positioned in an out of the way place, inasmuch as it readily affects the notification of the operator, through the signal at any time that the gravity of the battery electrolyte reaches a determined low point.

While this form of signaling device has been shown in connection with the form disclosed in Fig. 4, it will readily be understood that it may be combined with the form shown in Fig. 2, with equal facility, but it is not deemed necessary to show this device in connection with each of the various forms.

Having described the construction of the various forms of the present invention, the operation of the device will be readily apparent from the following description.

Now, as soon as the battery becomes partially discharged, one of the indicating members will tend to sink to the bottom of the supplemental chamber, while the other member will still tend to float adjacent to the top of said chamber.

The indicating members will be maintained in the above mentioned positions until the storage battery becomes substantially discharged, when the other member which remained floating adjacent to the top of the supplemental chamber will sink to the bottom of said chamber, indicating that the gravity of the electrolyte is below 1.150.

During the recharging of the storage battery, the indicating member which was the last to sink to the bottom of the supplemental chamber, will tend to rise to the top of said chamber as soon as the gravity of the electrolyte has reached a predetermined point, while the other member will rise to the top only when the battery is substantially fully charged.

Supposing that the battery has been under the charging effect of the electric generator 20 for an extended period of time, the specific gravity of the electrolyte contained in the battery jar 27, and also in the supplemental chamber 33, will have reached a point of substantially 1.275. At this time, both of the indicating members 35 will float adjacent to the top of the supplemental chamber, and if it is desired, the wall of the supplemental chamber may be so marked that the position of the balls will indicate the specific gravity of the electrolyte, (see Fig. 3).

In the form of the invention shown in Fig. 4, when both of the members 35 sink into such position as to rest on the seat 40 of the rod 38, the signaling device will be actuated so as to effect the ringing of the bell 42.

As soon as the attendant or operator has put the generator in operation, and the battery again begins to become charged, these balls or members 35 will accordingly tend to rise, inasmuch as the specific gravity or density of the electrolyte will increase.

From the above description it will be obvious that the relative positions of the indicating device or devices will correctly designate or indicate the condition of charge of the battery.

While the form of mechanism herein shown and described constitutes a preferred form of embodiment of the invention, it is to be understood that other forms might be adopted, all coming within the scope of the claims which follow.

What I claim is as follows:

1. In a battery indicating device, the combination with a battery jar having a main chamber, one of the walls of said battery jar being enlarged to form a supplemental chamber having communication with the main chamber, said supplemental chamber being entirely below the level of the liquid normally maintained in the main chamber; a wholly submerged indicating device positioned in said supplemental chamber, controlled as to its position by the specific gravity of the battery liquid; and a plate assembly positioned in the main chamber of the battery cell and constituting a wall for the supplemental chamber whereby to maintain the indicating device within the supplemental chamber.

2. In a battery indicating device, the combination with a main battery cell, including a main chamber and a supplemental chamber having communication with the main chamber substantially throughout its length; an indicating device positioned in said supplemental chamber and adapted to be controlled as to position by the specific gravity of the battery electrolyte; and a plate assembly positioned in the main chamber of the battery cell and constituting a wall for the supplemental chamber whereby to maintain the indicating device within the supplemental chamber.

3. In a battery indicating device, the combination with a battery jar having a main chamber, one of the walls of said battery jar being enlarged to form a supplemental chamber having communication with the main chamber by means of a passage of like cross-sectional dimensions as said supplemental chamber, said supplemental chamber being entirely below the level of the liquid normally maintained in the main chamber; an indicating device positioned in said supplemental chamber, controlled as to its position by the specific gravity of the battery liquid; and a plate assembly positioned in the main chamber of the battery cell and constituting a wall for the supplemental chamber whereby to maintain the indicating device within the supplemental chamber.

4. In a battery indicating device, the combination with a battery jar having a main chamber, one of the walls of said battery jar being enlarged to form a supplemental chamber having a passage for communication with the main chamber, said supplemental chamber being entirely below the level of the liquid normally maintained in the main chamber, a wholly submerged indicating device positioned in said supplemental chamber and controlled as to its position by the specific gravity of the battery liquid, the largest section through said indicating device being smaller than that of said passage, and a plate assembly positioned in the main chamber of the battery cell and having the edge portions of said plates arranged opposite to said supplemental chamber so as to coöperate with said battery jar walls in order to retain the indicating device within the supplemental chamber.

5. In a battery of the fluid type, in combination, a battery jar having a portion of the wall thereof bulged outwardly to form a channel said channel being entirely below the surface of the electrolyte and opening inwardly without restrictions throughout its length and breadth, a hydrometer-indicator in said channel and freely movable therein, and a plate assembly in said battery jar disposed adjacent to said channel whereby said hydrometer-indicator is prevented from escaping therefrom.

6. In a battery of the fluid type, in combination, a battery jar having a portion of the wall thereof bulged outwardly to constitute a non-horizontal channel, a hydrometer-indicator in said channel arranged and adapted to have a rising and a falling movement therein, and a plate assembly in said battery jar disposed adjacent to said channel whereby said hydrometer-indicator is prevented from escaping therefrom.

7. As an article of manufacture, a battery jar having a portion of the wall thereof bulged outwardly to form an inwardly opening channel said opening being without restrictions, and said channel terminating before reaching the opening of said battery jar.

In testimony whereof I affix my signature in the presence of two subscribing witnesses.

RALPH H. GRANT.

Witnesses:
J. W. McDonald,
O. D. Mowry.